US010839443B2

United States Patent
Byron et al.

(10) Patent No.: US 10,839,443 B2
(45) Date of Patent: Nov. 17, 2020

(54) REAL-TIME CONTEXT BASED RECIPE RECOMMENDATION SYSTEM

(71) Applicant: International Business Machines Corporation, Armonk, NY (US)

(72) Inventors: Donna K. Byron, Petersham, MA (US); Carmine M. Dimascio, West Roxbury, MA (US); Florian Pinel, New York, NY (US); Timothy P. Winkler, Clinton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 15/000,087

(22) Filed: Jan. 19, 2016

(65) Prior Publication Data

US 2017/0206584 A1    Jul. 20, 2017

(51) Int. Cl.
*G06Q 30/06* (2012.01)
*G09B 19/00* (2006.01)
(Continued)

(52) U.S. Cl.
CPC ... *G06Q 30/0631* (2013.01); *G06F 16/24575* (2019.01); *G06F 16/9535* (2019.01);
(Continued)

(58) Field of Classification Search
CPC ........... G06Q 30/0631; G06Q 30/0643; G06Q 30/0633; G06F 16/9535; G06F 16/9554;
(Continued)

(56) References Cited

U.S. PATENT DOCUMENTS

| 6,587,835 B1 * | 7/2003 | Treyz ..................... G06Q 20/12 |
| | | 705/14.64 |
| 8,412,590 B2 * | 4/2013 | Elliott .................... G01C 21/20 |
| | | 705/26.9 |

(Continued)

OTHER PUBLICATIONS

Z. Davis, M. Hu, S. Prasad, M. Schuricht, P. M. Melliar-Smith and L. E. Moser, "A Personal Handheld Multi-Modal Shopping Assistant," International conference on Networking and Services (ICNS'06), Slicon Valley, CA, 2006, pp. 117-117, doi: 10.1109/ICNS.2006.10. (Year: 2006).*

(Continued)

*Primary Examiner* — Michelle T Kringen
*Assistant Examiner* — Lance Y Cai
(74) *Attorney, Agent, or Firm* — Cantor Colburn LLP; Ingrid M. Foerster

(57) ABSTRACT

Aspects include real-time context based recipe recommendations including receiving, at a mobile device, an identifier of an available food item that is offered for purchase at a food marketplace. A request for recipes that specifies the identifier of the available food item and a list of identifiers of food items previously selected by the shopper for purchase is sent to a recipe application. At least one recipe selected by the recipe application is received at the mobile device and presented to the shopper. The recipe includes the available food item and at least a subset of the food times previously selected by the shopper. The identifier of the available food item is added to the list of food items previously selected by the shopper for purchase based on determining that the shopper has selected the available food item for purchase.

8 Claims, 7 Drawing Sheets

(51) Int. Cl.
*G06F 16/2457* (2019.01)
*G06F 16/9535* (2019.01)
*G06F 16/955* (2019.01)

(52) U.S. Cl.
CPC ..... *G06F 16/9554* (2019.01); *G06Q 30/0633* (2013.01); *G09B 19/0092* (2013.01)

(58) Field of Classification Search
CPC .. G06F 16/24575; G09B 5/02; G09B 19/0092
USPC .............................. 705/26.1, 26.7, 27.1, 27.2
See application file for complete search history.

(56) References Cited

U.S. PATENT DOCUMENTS

| | | | | |
|---|---|---|---|---|
| 9,286,783 | B1* | 3/2016 | Teller | G08B 21/24 |
| 9,519,694 | B2* | 12/2016 | Kamei | G06Q 10/00 |
| 2005/0038719 | A1* | 2/2005 | Young | G06Q 10/087 |
| | | | | 705/28 |
| 2007/0141540 | A1 | 6/2007 | Borg | |
| 2008/0052001 | A1* | 2/2008 | Bodin | G06F 19/3475 |
| | | | | 702/1 |
| 2010/0292998 | A1 | 11/2010 | Bodlaender et al. | |
| 2013/0073405 | A1* | 3/2013 | Ariyibi | G06Q 30/02 |
| | | | | 705/17 |
| 2013/0149676 | A1 | 6/2013 | Tokuda et al. | |
| 2013/0282533 | A1* | 10/2013 | Foran-Owens | G06Q 30/0641 |
| | | | | 705/27.1 |
| 2014/0058886 | A1* | 2/2014 | Gopalakrishnan | G06Q 30/02 |
| | | | | 705/26.8 |
| 2014/0074649 | A1* | 3/2014 | Patel | G06Q 30/0631 |
| | | | | 705/26.7 |
| 2014/0089321 | A1 | 3/2014 | Engel et al. | |
| 2014/0095479 | A1* | 4/2014 | Chang | G06F 17/30699 |
| | | | | 707/722 |
| 2014/0164176 | A1* | 6/2014 | Kitlyar | G06Q 30/0633 |
| | | | | 705/26.8 |
| 2014/0272816 | A1* | 9/2014 | Callahan | G06Q 30/0633 |
| | | | | 434/127 |
| 2015/0006319 | A1* | 1/2015 | Thomas | G06Q 30/0633 |
| | | | | 705/26.8 |
| 2017/0206585 | A1 | 7/2017 | Byron et al. | |

OTHER PUBLICATIONS

Donna K. Byron, et al., Pending U.S. Appl. No. 15/060,907 entitled "Real-Time Context Based Recipe Recommendation System," filed Mar. 4, 2016.
List of IBM Patents or Patent Applictions Treated as Related; (Appendix P), filed Mar. 4, 2016, 2 pages.

* cited by examiner

REAL-TIME CONTEXT BASED RECIPE RECOMMENDATION SYSTEM

BACKGROUND

The invention relates generally to a recipe recommendation system, and more specifically, to a real-time context based recipe recommendation system.

One reason that shopping at a farmer's market is different than going to a grocery store is the changing variety of food item choices due, for example, to seasonal and other local conditions. Oftentimes shoppers do not bring a set grocery list but instead show up and see what looks good that week. Shoppers may find a unique food that they would like to try but aren't sure how to use or prepare the food. Thus, a shopper at a farmer's market runs the risk of buying a basket full of food and going home and still not having anything to make for meals because none of the purchased items work together. Coming home from grocery shopping with nothing to make for dinner may occur more frequently when shopping at a farmer's market type of venue however it can also happen when shopping in a standard grocery store when the store is out of a key ingredient, has seasonal specials, or has selected items at reduced prices.

SUMMARY

According to an embodiment a method, system, and computer program product for real-time context based recipe recommendation. A method includes receiving, at a mobile device of a shopper, an identifier of an available food item that is offered for purchase at a food marketplace. A request for recipes is sent by the mobile device to a recipe application, the request specifies the identifier of the available food item and a list of identifiers of food items previously selected by the shopper for purchase. At least one recipe selected by the recipe application is received at the mobile device, the at least one recipe including the available food item and at least a subset of the food items previously selected by the shopper for purchase. The shopper is presented with the at least one recipe. It is determined whether the shopper has selected the available food item for purchase. The identifier of the available food item is added to the list of identifiers of food items previously selected by the shopper for purchase based on determining that the shopper has selected the available food item for purchase.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Embodiments described herein are directed to providing real-time context based recipe recommendations. Embodiments can be used to provide suggestions on how to use new food ingredients by providing recipe suggestions that incorporate specified food ingredients in real-time (e.g., while the shopper is at a food marketplace such as a farmer's market or grocery store). Embodiments can also be used to help to optimize compatibility between the food items that a shopper is planning on purchasing by providing recipe suggestions that incorporate multiple items that the shopper has on hand (e.g., in the shopping cart, at home).

Existing radio-frequency identification (RFID) technology can be utilized by embodiments to track what is in a shopper's basket (i.e., previously selected) and what is available from a food vendor that is in front of (or proximate) to the shopper. As the shopper walks by a given ingredient, or food item, a shopping application on the shopper's mobile device presents the shopper (e.g., via a display screen) with recipes that include the given ingredient combined with other ingredients already in the shopper's basket. Recipe recommendations from the shopping application can also incorporate food items that the shopper has bought in the past. Recipes can be displayed on a mobile device such as, but not limited to: a Google Glass; a tablet; and a cellular telephone.

In embodiments, food items can be tagged with RFID tags which store identifiers of the food items. A mobile device used by the shopper can include a RFID reader to read the food item identifiers on the RFID tags. As the shopper moves around a food marketplace (e.g., a farmer's market or grocery store or other shopping venue), the items currently in front of the shopper can be compared to the food items that are already in the shopper's basket (food items previously selected by the shopper), and recipes involving the target item and some combination of items from the shopper's basket are suggested to the shopper. If past shopping habits of the shopper are available, they can be incorporated into a scoring algorithm to push things that the shopper is more likely to enjoy to the top of a list of recipes.

Figure 1:
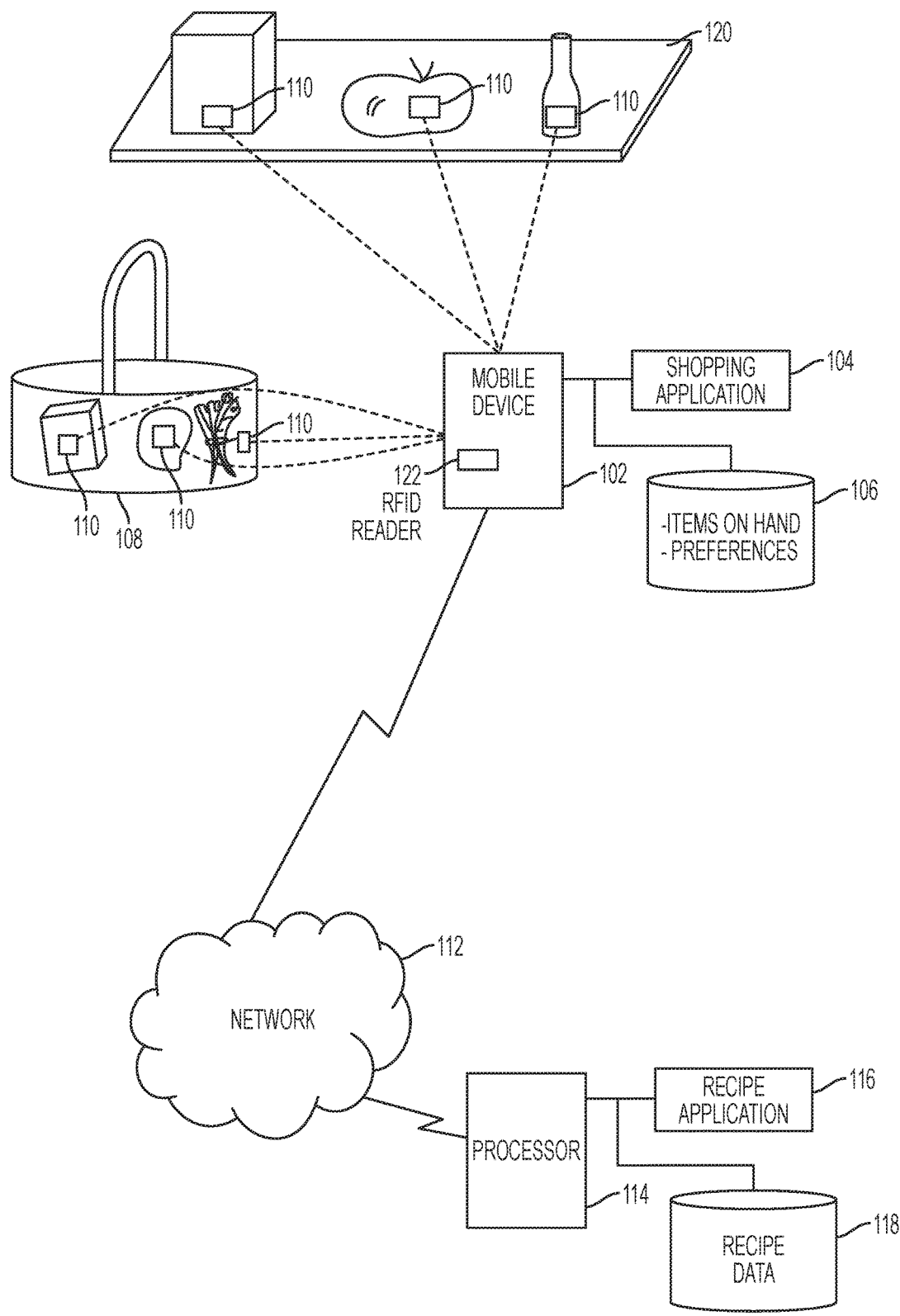
FIG. 1 depicts a block diagram of a system for a real-time context based recipe recommendation system in accordance with an embodiment.

Turning now to FIG. 1, a block diagram of a system for a real-time context based recipe recommendation system is generally shown in accordance with an embodiment. The embodiment shown in FIG. 1 includes available food items 120 that are for sale by a vendor and selected food items 108 that are in the shopper's basket (food items previously selected by the shopper). Both the available food items 120 and the selected food items 108 include RFID tags 110 that are read by a RFID reader 122 located on a mobile device 102. In an embodiment, the RFID tags 110 store identifiers of the corresponding food item that can be read by the RFID reader 122 as input to the shopping application 104. In embodiments, the RFID tags 110 are passive in that they collect energy from the interrogating radio waves and act as passive transponders to return the food item identifiers to the RFID reader 122. The RFID reader 122 sends an encoded radio signal to interrogate a RFID tag 110, which responds with a tag identifier. In embodiments, the tag identifier is translated by the shopping application 104 into a food item identifier, in other embodiments, the RFID tags 110 return food item identifiers along with tag identifiers to the RFID reader.

The shopping application 104 receives the food item identifiers for the available food items 120 and the previously selected food items 108. In an embodiment, the shopping application 104 requests updates on contents of the shopping cart, e.g., the previously selected food items 108 on a periodic basis. The RFID reader 122 can distinguish between signals received from the available food items 120 and already selected food items 108 in a variety of manners such as, but not limited to: scanning or otherwise directly recording selected items as they are placed in the cart rather than relying on the RFID as a proximity sensor. In other embodiments, RFID technology is combined with movement sensors on the food items and the algorithm can see the difference between items that are moving in conjunction with the shopper and those that remain at a consistent distance (e.g., a programmable threshold distance) from the shopper vs. other items that are changing their distance as the shopper moves around.

The food item identifiers for the available food items 120 and the selected food items 108 can be transmitted, as shown in FIG. 1 via a network 112, by the shopping application 104 to a recipe application 116 for recipe suggestions. In embodiments, information 106 such as items on hand in the shoppers home and preferences of the shopper are also sent to the recipe application 116. The recipe application 116 is shown in FIG. 1 as being implemented on a processor 114 and having access to recipe data 118 stored in a storage device. Any recipe application 116 that can receive recipe ingredients as input and that can output a suggested recipe(s) based on the ingredients can be utilized by embodiments. For example, Supercook, Recipes By Ingredients from AB Mobile Apps, and MyFridgeFood are examples of a few of the recipe applications 116 that can be utilized by embodiments. In addition, a recipe application 116 that generates new recipes based on ingredients, such as that described in U.S. Patent Publication Number 2014/0188566, can also be utilized by embodiments. The recipe application 116 can be located and executed on a processor 114 remote from the mobile device 102 as shown in FIG. 1. Alternatively, all or a portion of the recipe application 116 and its associated recipe data 118 can be located on the mobile device 102. Similarly, the shopping application 104 can be located and executed on the mobile device 102 as shown in FIG. 1. Alternatively, all or a portion of the shopping application 104 and associated information 106 can be located on the processor 114 remote from the mobile device 102.

Figure 2:
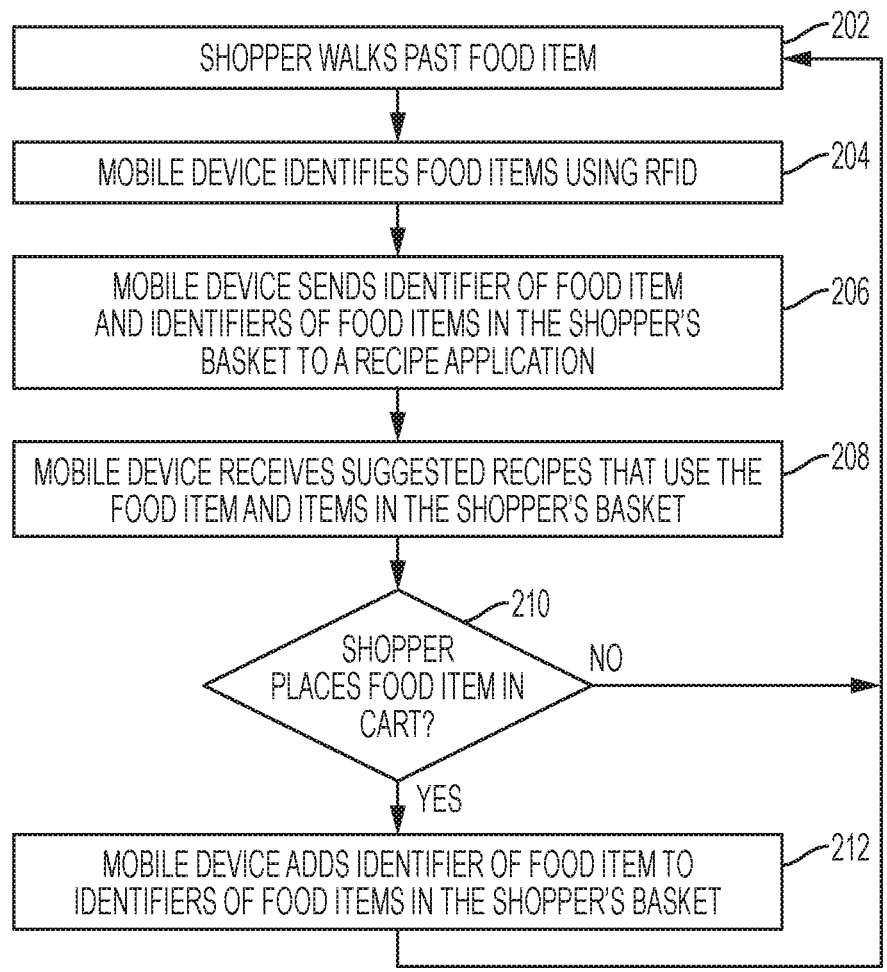
FIG. 2 depicts a process flow for real-time context based recipe recommendation in accordance with an embodiment.

Turning now to FIG. 2, a process flow for real-time context based recipe recommendation is generally shown in accordance with an embodiment. In an embodiment, the processing shown in FIG. 2 is performed by the shopping application 104 executing on the mobile device 102 shown in FIG. 1. In embodiments, the shopping application 104 is initiated, which causes the RFID reader 122 on the mobile device 102 to send radio signals to interrogate RFID tags 110 which are proximate (within reception range of the radio signals) to the mobile device 102. At block 202, a shopper walks past a food item that is tagged with an RFID tag 110. At block 204, the shopping application 104 receives the tag identifier (and optionally other information) from the RFID reader 122 and identifies the available food item(s) 120.

At block 206, the shopping application 104 sends the identifier of the available food item 120 along with identifiers of any selected food items 108 that are already in the shopper's basket (or cart, or otherwise in possession of the shopper) to the recipe application 116. In this manner, the shopping application 104 sends a list of ingredients to the recipe application 116 and requests recipe suggestions. In embodiments, the shopping application 104 sends additional information to the recipe application 116 related to shopper preferences which can be factored in by the recipe application 116 when selecting recipes and/or by the shopping application 104 when presenting recipes to the shopper. Preferences can relate to, but are not limited to: foods to avoid (e.g., due to allergies, dislikes, dietary restrictions); favorite foods; preferred spice level; length of time to cook; length of time to prepare; and preferred cooking methods.

In embodiments, the shopper can receive, via a display on the mobile device 102, a list of available food items 120 and the shopper can select one or more of the available food items 120 for inclusion in a recipe. In these embodiments, just the selected available food item (s) 120 is sent to the recipe application 116. Similarly, the shopper can indicate a subset of the selected food items 108 in the shopper's basket for inclusion in a recipe, with only the indicated subset sent to the recipe application 116 for recipe suggestions.

At block 208 of FIG. 2, the shopping application 104 receives one or more suggested recipes back from the recipe application 116 that uses the available food item(s) 120 and possibly one or more additional ingredients that the shopper has already selected for purchase. The one or more suggested recipes are presented to the shopper for example, via a display on the mobile device 102 or in an audible fashion via a speaker on the mobile device 102. In embodiments, the suggested recipes are ranked based on what percentage of the previously selected food items 108 are used by the recipe. In embodiments, additional on hand food items, such as those at the shopper's home are also taken into account by the ranking.

At block 210 of FIG. 2, it is determined whether the shopper has placed one of the available food items 120 in his or her basket. If the available food item 120 was placed in the shopper's basket, then block 212 is performed to indicate that the available food item 120 is now a selected food item 108 (e.g., is on list of food items previously selected by the shopper). If the available food item 120 was not placed in the shopper's basket, then processing continues at block 202 where the shopper continues to walk past food items which are monitored by the shopping application 104.

Figure 3:
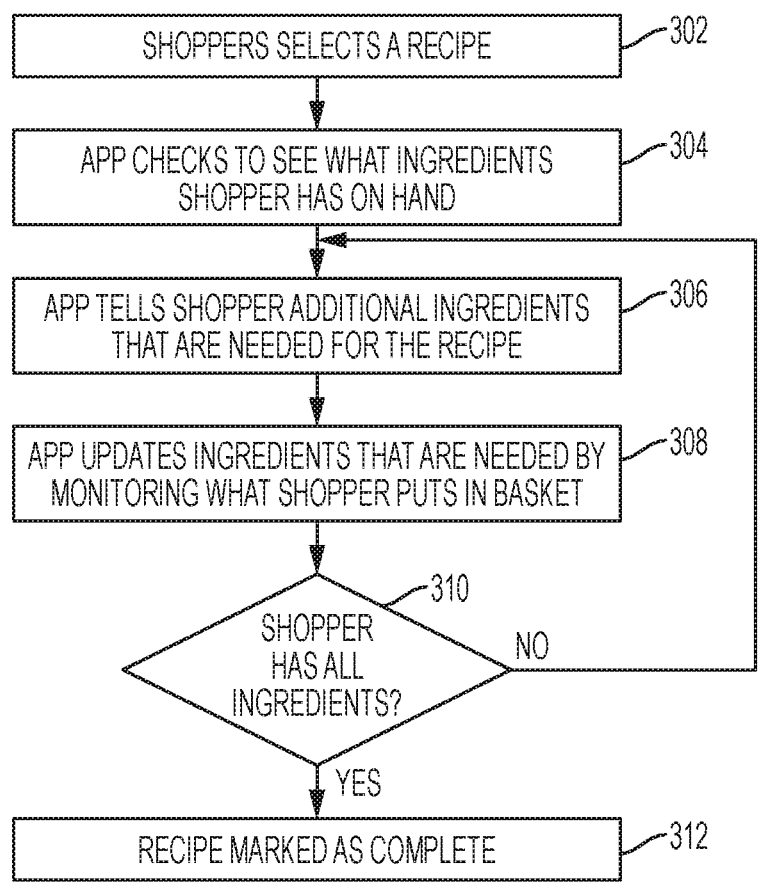
FIG. 3 depicts a process flow for real-time context based shopping recommendation in accordance with an embodiment.

Turning now to FIG. 3, a process flow for real-time context based shopping recommendation is generally shown in accordance with an embodiment. In an embodiment, the processing shown in FIG. 3 is performed by the shopping application 104 executing on the mobile device 102 shown in FIG. 1 once the shopper is presented with a list of one or more recipes that were received from the recipe application 116 (e.g., at block 208 of FIG. 2). At block 302 of FIG. 3, the shopper selects a recipe from the list of recipes and at block 304 of FIG. 3, the shopping application 104 checks to see what ingredients in the recipe that the shopper has on hand. In an embodiment, the ingredients that are on hand are the food items that the shopper has in his or her shopping cart. In other embodiments, the ingredients that are on hand also include the food items that the shopper has at home (or other location). The food items at home can be determined by the shopping application 104 using the RFID reader and/or they can be entered manually by the shopper.

At block 306 of FIG. 3, the shopping application 104 presents the shopper with a list of at least one additional ingredient that is needed for the selected recipe. In an embodiment, this list includes those food items that are not in the shopper's cart. In other embodiments, the list includes those food items are not in the shopper's cart and not at the shopper's home. The list of at least one additional ingredient can be presented to the shopper for example, via a display on the mobile device 102 or in an audible fashion via a speaker on the mobile device 102. In another embodiment, instead of showing the exact ingredients from the selected recipe, the shopping application 104 can show categories of ingredients (e.g., root vegetables, leaf vegetables, red meat) and notify the shoppers whenever they walk by one or more ingredients in those categories. At block 308, the shopping application 104 continues to update the list of additional ingredients required by monitoring the food items that the shopper puts in his or her basket. It is determined at block 310 whether the shopper has all of the ingredients for the selected recipe. Block 312 is performed and the recipe is marked as complete when it is determined at block 310 that the shopper has all of the ingredients for the selected recipe. Processing continues at block 306 based on the shopping application 104 determining at block 310 that the shopper does not have all of the ingredients for the selected recipe at block 310. In embodiments, the processing shown in FIG. 3 is performed simultaneously for two or more recipes that are selected by the shopper.

Figure 4:
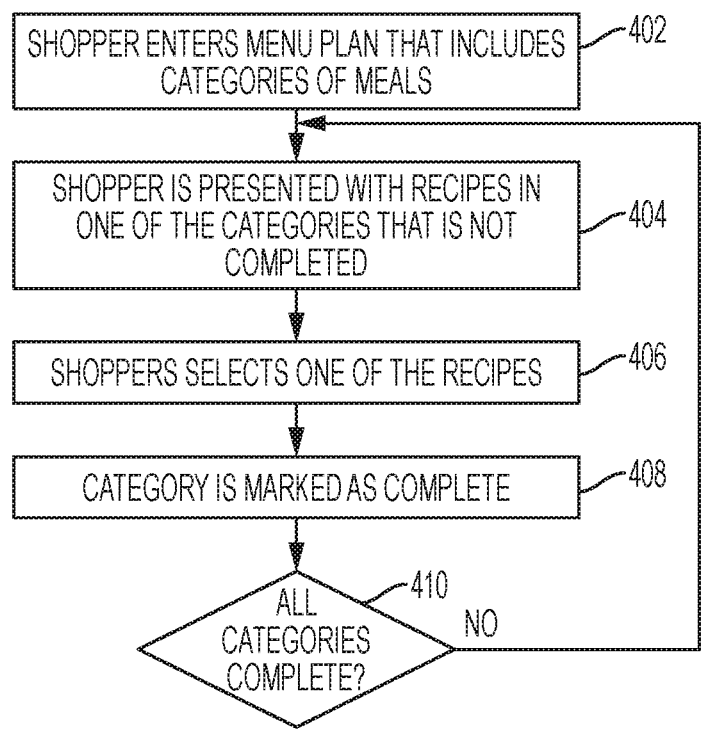
FIG. 4 depicts a process flow for real-time context based menu planning in accordance with an embodiment.

Turning now to FIG. 4, a process flow for real-time context based menu planning is generally shown in accordance with an embodiment. In an embodiment, the processing shown in FIG. 4 is performed by the shopping application 104 executing on the mobile device 102 shown in FIG. 1. In an embodiment, the processing shown in FIG. 4 supplements the processing shown in FIGS. 2 and 3. For example, block 402 can be performed prior to the processing shown in FIG. 2 and FIG. 3. At block 402, a shopper enters a menu plan that includes categories of meals into the shopping application. In an embodiment, a shopper can enter the menu plan prior to shopping to generally define types of meals for particular days and times. Categories can be focused on types of food, such as hamburger for dinner on Monday, fish on Tuesday, meatless on Wednesday, and pasta on Thursday. Categories can also be focused on types of meals, such as, but not limited to: the amount of time that it takes to prepare, the amount of time that it takes to cook, the type of cooking (e.g., pan, oven, outdoor grill), the total number of different ingredients, and level of cooking skill suggested. Categories can be combined, for example, a recipe for fish that takes less than an hour to prepare and that also can be prepared on an outdoor grill can be specified for a meal. The shopping application 104 requests a recipe from the recipe application 116 fitting as many categories as possible. Recipes can be ranked for presentation to the shopper based on how many categories they match.

At block 404 of FIG. 4, the shopper is presented (e.g., via a display or audio output on mobile device 102) with recipes in one of the categories that is not completed. In embodiments, block 404 is performed as part of block 208 of FIG. 2. At block 404, the shopper is presented with recipes in one of the categories of meals that is not completed. For example, if the shopper requests a recipe that includes grilling fish on an outdoor grill and a recipe is returned from the recipe application 116 that fits these categories, and selected by the shopper at block 406, then this meal category is marked as complete at block 408. Thus, at block 208 in FIG. 2, the shopper is no longer presented with recipes that fall into this meal category. Processing continues at block 410, where it is determined whether all of the meal categories have been completed. If they have not been completed, then processing continues at block 404.

In an embodiment, a shopper enters a menu plan that includes: chicken cooked on a grill on Monday; a vegetarian meal on Tuesday; and a pasta meal with hamburger on Wednesday. When the shopper is walking around the farmer's market, the shopper may have fresh dill in his or her basket, and be passing by fresh lemons. The shopping application 104 can request recipes that include dill and lemons; as well as one of chicken cooked on a grill; a vegetarian meal; and a pasta meal with hamburger from the recipe application 116. The shopper can be presented with a list of recipes including a dill and lemon marinade sauce for grilled chicken, as well as a vegetarian casserole with dill and lemon. The shopper can select the recipe for the dill and lemon marinade sauce for grilled chicken. The shopping application 104 can then track the required ingredients for the recipe as described in reference to FIG. 3. In addition, the shopping application will no longer present recipes for chicken cooked on a grill to the shopper during this shopping trip since that category has been complete. Instead, at block 404, the shopping application 104 can request recipes that include a vegetarian meal or a pasta meal with hamburger from the recipe application 116. In this manner, a shopper can fill out an outline of a menu plan and make final decisions based on what food items are available.

In an embodiment, food items required by selected recipes that are not in the shopper's cart or the shopper's home can be presented, or output, to the shopper via a display on the mobile device 102 or to a printer. In embodiments, the remaining items can be sent automatically to a grocery ordering service for delivery to the shopper.

Embodiments can be implemented with any technology that allows for a food item to be recognized by an application executing on a mobile device. For example, in embodiments, image recognition, barcodes and/or quick response (QR) code scanners can be used in place of or along with RFID for identifying food items.

Figure 5:
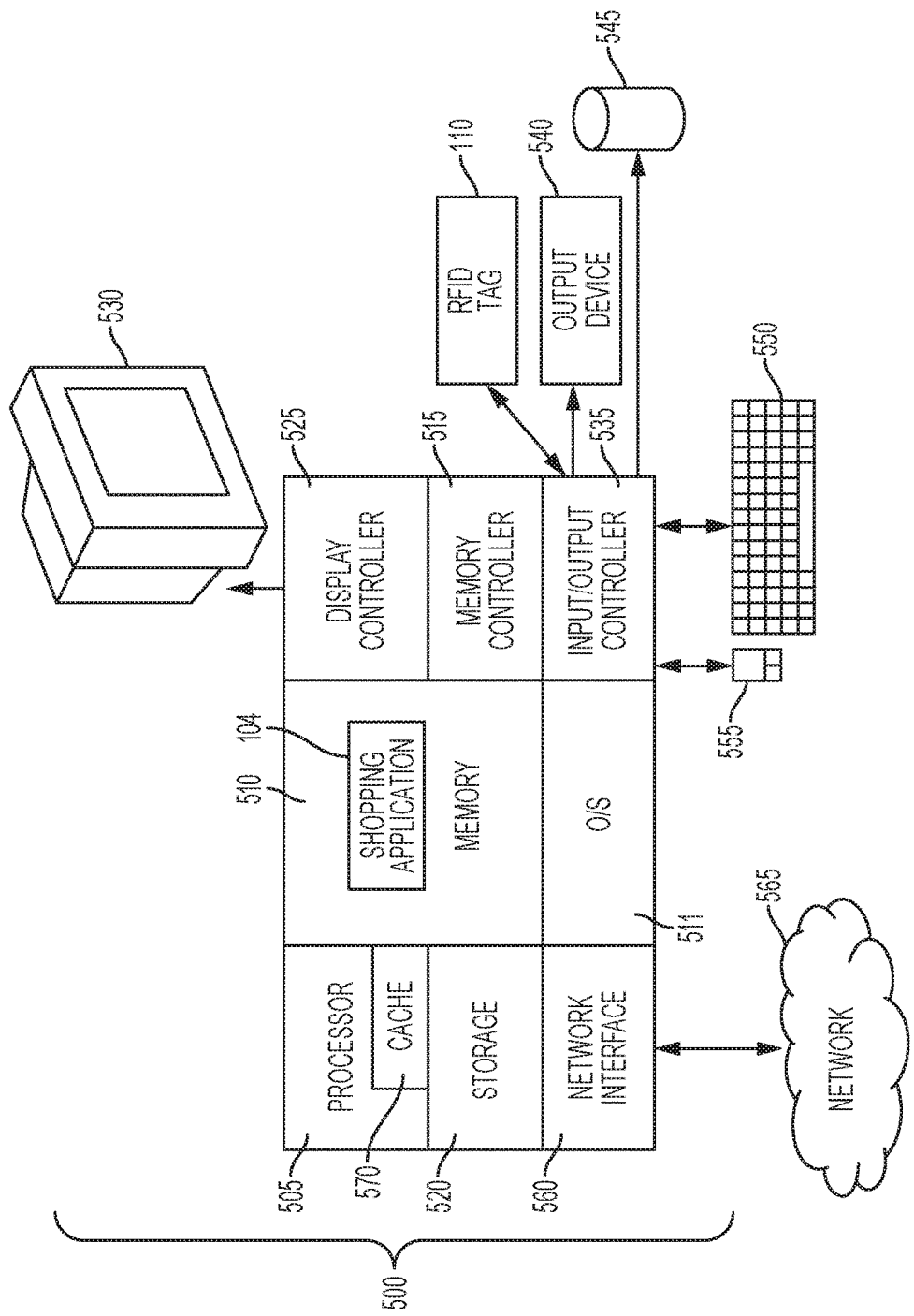
FIG. 5 depicts a block diagram of a computing device for implementing some or all aspects of the system in accordance with an embodiment.

Turning now to FIG. 5, a block diagram of a computing device for implementing some or all aspects of the system is generally shown in accordance with an embodiment. FIG. 5 illustrates a block diagram of a computing device 500 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device 500, such as a cellular phone, a personal digital assistant (PDA), tablet computer, personal computer, workstation, minicomputer, or mainframe computer for example.

In some embodiments, as shown in FIG. 5, the computing device 500 includes a processor 505, memory 510 coupled to a memory controller 515, and one or more input devices 545, and output devices 540, which are communicatively coupled via a local I/O controller 535. These devices 540, 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, an RFID tag 110, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computing device 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services. The instructions in the memory also include instructions for implementing embodiments of the shopping application 104 described herein.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the systems and methods of this disclosure.

The computing device 500 may further include a display controller 525 coupled to a display 530. In some embodiments, the computing device 500 may further include a network interface 560 for coupling to a network 565. The network 565 may be an IP-based network for communication between the computing device 500 and an external server, client and the like via a broadband connection. The network 565 transmits and receives data between the computing device 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computing device 500, such as that illustrated in FIG. 5.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
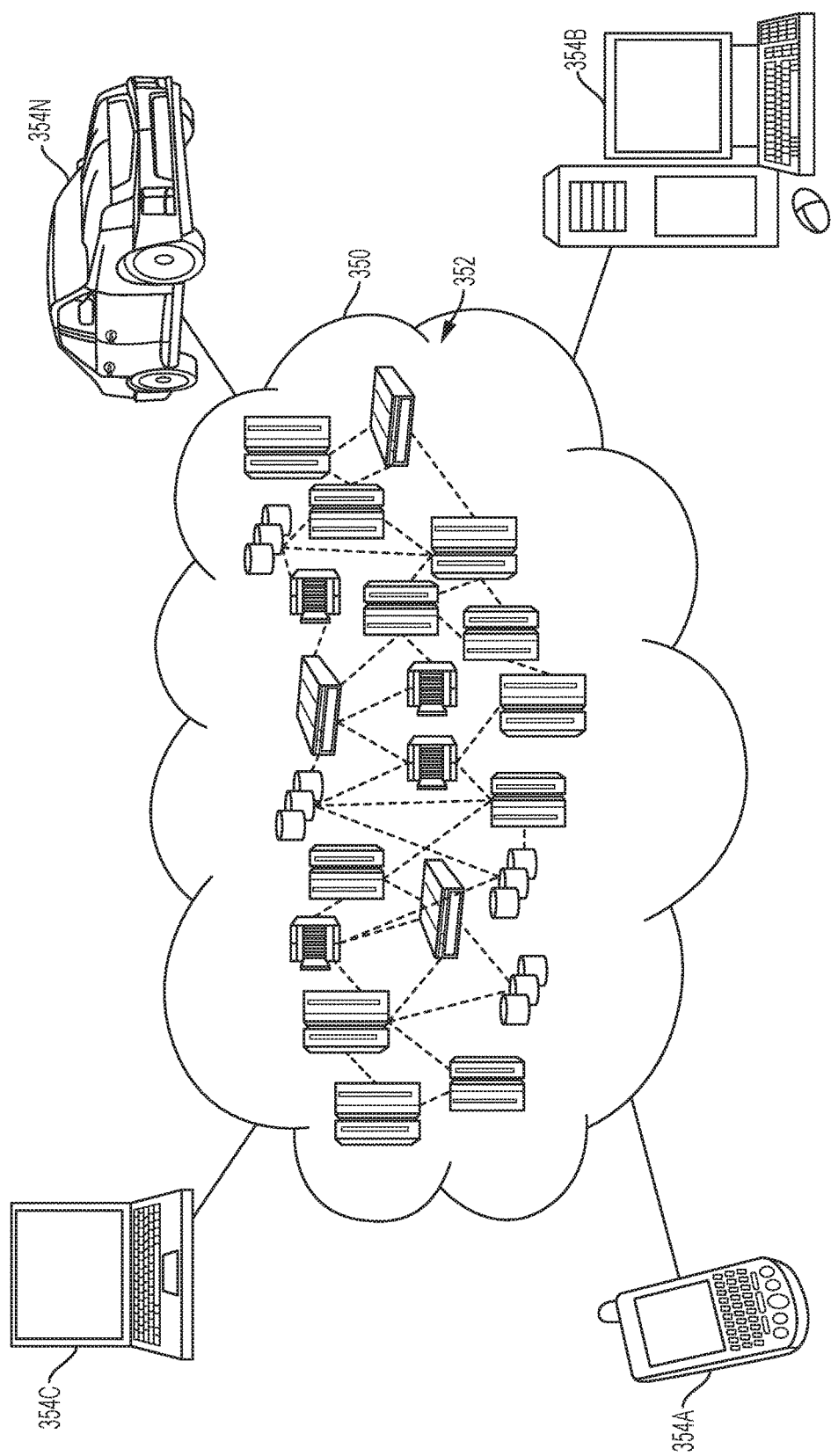
FIG. 6 depicts a cloud computing environment in accordance with an embodiment.

Referring now to FIG. 6, illustrative cloud computing environment 350 is depicted. As shown, cloud computing environment 350 comprises one or more cloud computing nodes 352 with which local computing devices used by cloud consumers, such as, for example, personal digital assistant (PDA) or cellular telephone 354A, desktop computer 354B, laptop computer 354C, and/or automobile computer system 354N may communicate. Nodes 352 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 6 are intended to be illustrative only and that computing nodes 352 and cloud computing environment 350 can communicate with any type of computerized device over any type of network and/or network addressable connection (e.g., using a web browser).

Figure 7:
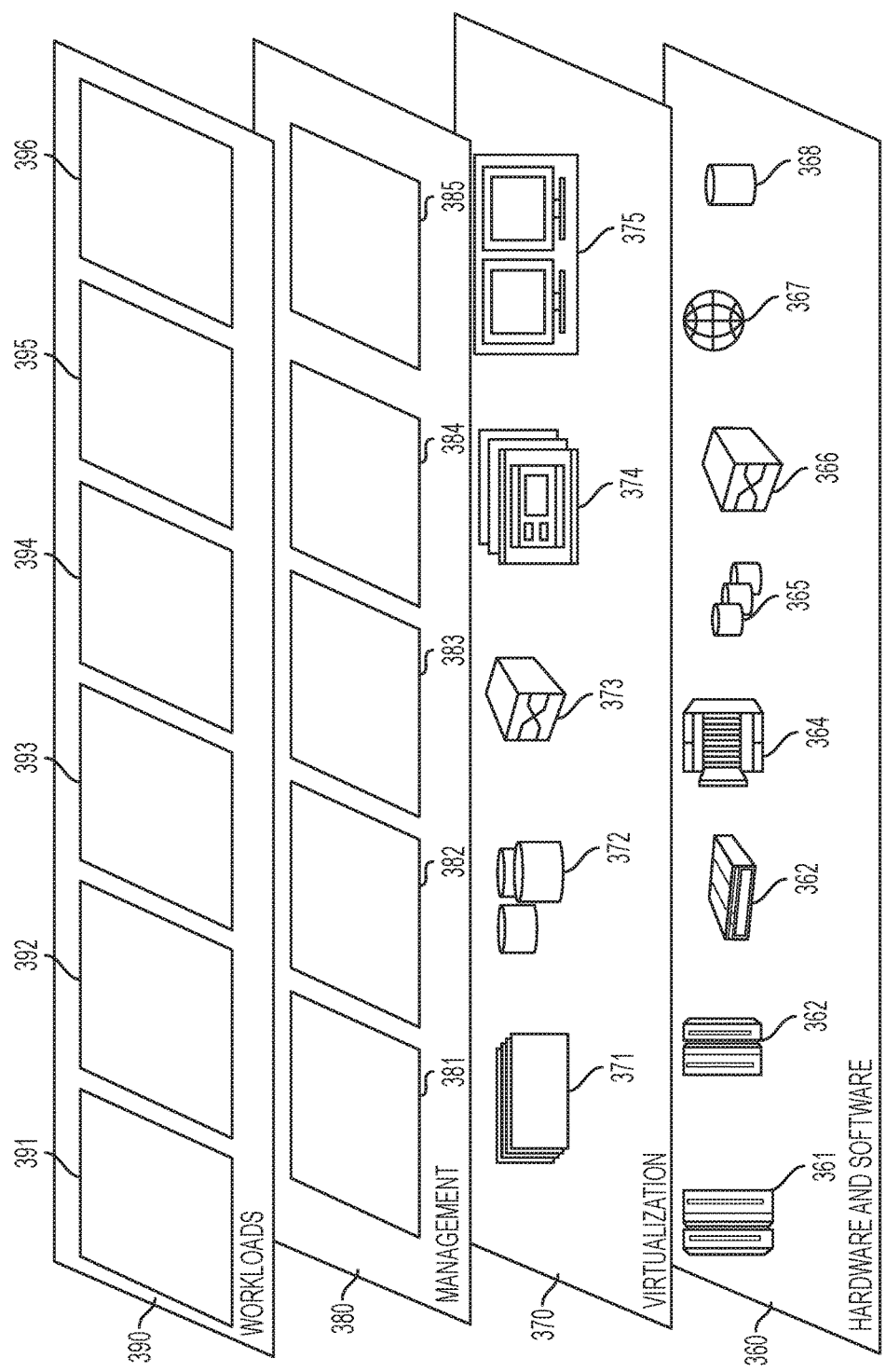
FIG. 7 depicts abstract model layers in accordance with an embodiment.

Referring now to FIG. 7, a set of functional abstraction layers provided by cloud computing environment 350 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provides pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and an image processing and object location processing 396.

Technical effects and benefits include the ability to provide real-time recipe suggestions to a shopper which takes into account food items that are available to the shopper in a current location (e.g., farmer's market or grocery store) and previously selected food items that are already in the shopper's cart. In addition, embodiments can factor in shopper food preferences and food items that the shopper already has on hand when making recipe suggestions. This can result in optimizing the utility of grocery shopping by providing guidance in selecting items that can be used together to make meals.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a mobile device of a shopper, the mobile device comprising:
   a memory having computer readable instructions; and
   a processor for executing the computer readable instructions, the computer readable instructions including:
      receiving, at a shopping application executing on the mobile device, a menu plan that includes categories of meals not completed, the menu plan entered by the shopper via a user interface of the shopping application;
      receiving, at the shopping application executing on the mobile device of the shopper, an identifier of an available food item that is offered for purchase at a food marketplace, wherein:
         the mobile device is utilized by a shopper at the food marketplace; and
         the receiving of the identifier at the shopping application is in response to the mobile device being proximate to the available food item;
      sending a request, by the shopping application executing on the mobile device to a recipe application, for recipes that fit at least one of the categories of meals not completed to a recipe application, the request specifying:
         the identifier of the available food item and a list of identifiers of food items previously selected by the shopper for purchase, and
         a list of additional ingredients that the shopper does not need to purchase that are not included in the list of identifiers of food items previously selected by the shopper for purchase;
      receiving, at the shopping application executing on the mobile device, a plurality of recipes that fit a category in the categories of meals not completed, the plurality of recipes selected by the recipe application based on the request, each of the plurality of recipes incorporating multiple food items, including the available food item and at least a subset of the food items previously selected by the shopper for purchase;
      ranking the plurality of recipes based on a percentage of the food items previously selected by the shopper for purchase that are included in each of the plurality of recipes;
      presenting, via the user interface of the mobile device, the plurality of recipes to the shopper, the presenting in an order that is based on the ranking;
      receiving, at the shopping application executing on the mobile device, an indication that the shopper has selected a recipe from the plurality of recipes;
      marking the category as completed in response to the indication that the shopper has selected the recipe;
      determining whether the shopper has selected the available food item for purchase, wherein the food item is determined to be selected by the shopper for purchase based at least in part on a distance between the food item and the shopper remaining within a threshold distance over time as the shopper moves around the marketplace;
      based on determining that the shopper has selected the available food item for purchase, adding the identifier of the available food item to the list of identifiers of food items previously selected by the shopper for purchase; and
      repeating the receiving an identifier of an available food item, sending a request, receiving a plurality of recipes, presenting the plurality of recipes, receiving an indication that the shopper has selected the recipe, and marking the category as completed.

2. The system of claim 1, wherein the request further specifies food preferences of the shopper for the recipe application to take into account when selecting the at least one recipe.

3. The system of claim 1, wherein the available food item is tagged by a radio-frequency identification (RFID) tag, and the identifier of the available food item is received from the RFID tag by a RFID reader located on the mobile device when the available food item is proximate to the mobile device.

4. The system of claim 1, wherein the computer readable instructions further include:
   determining additional ingredients included in the selected recipe that are not in the list of food items previously selected by the shopper; and
   presenting a list of the additional ingredients to the shopper.

5. A computer program product comprising a non-transitory computer readable storage medium having program instructions embodied therewith, the program instructions executable by a processor located on a mobile device of a shopper to cause the computer processor to perform:
   receiving, at a shopping application executing on the mobile device, a menu plan that includes categories of meals not completed, the menu plan entered by the shopper via a user interface of the shopping application;
   receiving, at the shopping application executing on the mobile device of the shopper, an identifier of an available food item that is offered for purchase at a food marketplace, wherein:
      the mobile device is utilized by a shopper at the food marketplace; and
      the receiving of the identifier at the shopping application is in response to the mobile device being proximate to the available food item;
   sending a request, by the shopping application executing on the mobile device to a recipe application, for recipes that fit at least one of the categories of meals not completed to a recipe application, the request specifying:
      the identifier of the available food item and a list of food items previously selected by the shopper for purchase, and
      a list of additional ingredients that the shopper does not need to purchase that are not included in the list of identifiers of food items previously selected by the shopper for purchase;
   receiving, at the shopping application executing on the mobile device, a plurality of recipes that fit a category in the categories of meals not completed, the plurality of recipes selected by the recipe application based on the request, each of the recipes incorporating multiple food items, including the available food item and at least a subset of the list of food items previously selected by the shopper for purchase;

ranking the plurality of recipes based on a percentage of the food items previously selected by the shopper for purchase that are included in each of the plurality of recipes;

presenting, via the user interface of the mobile device, the plurality of recipes to the shopper, the presenting in an order that is based on the ranking;

receiving, at the shopping application executing on the mobile device, an indication that the shopper has selected a recipe from the plurality of recipes;

marking the category as completed in response to the indication that the shopper has selected the recipe;

determining whether the shopper has selected the available food item for purchase, wherein the food item is determined to be selected by the shopper for purchase based at least in part on a distance between the food item and the shopper remaining within a threshold distance over time as the shopper moves around the marketplace;

based on determining that the shopper has selected the available food item for purchase, adding the identifier of the available food item to the list of food items previously selected by the shopper for purchase; and repeating the receiving an identifier of an available food item, sending a request, receiving a plurality of recipes, presenting the plurality of recipes, receiving an indication that the shopper has selected the recipe, and marking the category as completed.

6. The computer program product of claim 5, wherein the request further specifies food preferences of the shopper for the recipe application to take into account when selecting the at least one recipe.

7. The computer program product of claim 5, wherein the available food item is tagged by a radio-frequency identification (RFID) tag, and the identifier of the available food item is received from the RFID tag by a RFID reader located on the mobile device when the available food item is proximate to the mobile device.

8. The computer program product of claim 5, wherein the program instructions executable by the processor further cause the computer processor to perform:

determining additional ingredients included in the selected recipe that are not in the list of food items previously selected by the shopper; and presenting a list of the additional ingredients to the shopper.

\* \* \* \* \*